United States Patent
Brown

(10) Patent No.: US 7,309,969 B2
(45) Date of Patent: Dec. 18, 2007

(54) APPARATUS AND METHOD FOR STARTING AN ELECTRIC MOTOR

(75) Inventor: Fred A. Brown, Coronado, CA (US)

(73) Assignee: Comair Rotron, Inc., San Diego, CA (US)

( * ) Notice: Subject to any disclaimer, the term of this patent is extended or adjusted under 35 U.S.C. 154(b) by 370 days.

(21) Appl. No.: 11/145,052

(22) Filed: Jun. 3, 2005

(65) Prior Publication Data
US 2005/0280386 A1 Dec. 22, 2005

Related U.S. Application Data

(60) Provisional application No. 60/581,079, filed on Jun. 18, 2004.

(51) Int. Cl.
*H02P 25/12* (2006.01)
(52) U.S. Cl. .................. 318/439; 318/138; 318/254

(58) Field of Classification Search ................. 318/138, 318/254, 439
See application file for complete search history.

(56) References Cited

U.S. PATENT DOCUMENTS

| 4,494,028 A | 1/1985 | Brown | 310/156 |
| 5,640,075 A * | 6/1997 | Brasseur et al. | 318/685 |
| 2005/0109138 A1* | 5/2005 | Tavarez | 74/84 S |

* cited by examiner

*Primary Examiner*—Rina Duda
(74) *Attorney, Agent, or Firm*—Bromberg & Sunstein LLP

(57) ABSTRACT

An apparatus and method of starting an electric motor (having a rotor that rotates in a given direction during steady state operation from the at rest position) generates a preliminary signal that causes the rotor to rotate in an opposite direction to that of the given direction. The method and apparatus also begin rotation of the rotor in the given direction after the rotor rotates in the opposite direction.

26 Claims, 2 Drawing Sheets

APPARATUS AND METHOD FOR STARTING AN ELECTRIC MOTOR

PRIORITY

This patent application claims priority from provisional U.S. patent application No. 60/581,079, filed Jun. 18, 2004, entitled, "GYRATING MOTOR," and naming Fred A. Brown as inventor, the disclosure of which is incorporated herein, in its entirety, by reference.

FIELD OF THE INVENTION

The invention generally relates to motors and, more particularly, the invention relates to starting motors from an at rest position.

BACKGROUND OF THE INVENTION

Conventional motors typically have a rotational portion (a "rotor"), a stationary portion (a "stator") rotationally secured to the rotor, and circuitry that causes the rotor to rotate in a predetermined manner. Among other functions, the circuitry may produce a predetermined force that causes the rotor to begin rotating from an at rest position. This force often is referred to in the art as "starting torque."

Undesirably, there are times when the starting torque of a motor is not strong enough to overcome its at rest inertia. For example, in automotive applications, it may be necessary for a small DC electric fan to start at very low temperatures (e.g., −40 degrees C.). In such case, frozen moisture on the motor bearing system may produce a large rotor drag that requires a very high torque to start the motor. If this high torque is greater than the starting torque, then the motor may not start rotating. In addition to this, a variety of other factors, such as humidity, dust, bearing grease, and mounting position also may produce a rotor drag that the starting torque cannot overcome.

SUMMARY OF THE INVENTION

In accordance with one aspect of the invention, an apparatus and method of starting an electric motor (having a rotor that rotates in a given direction during steady state operation from the at rest position) generates a preliminary signal that causes the rotor to rotate in an opposite direction to that of the given direction. The method and apparatus also begin rotation of the rotor in the given direction after the rotor rotates in the opposite direction.

Among other things, the preliminary signal may be a magnetic field or an electrical signal. Moreover, the method and apparatus may generate a second signal that causes the rotor to rotate in the given direction. The second signal illustratively is generated after the preliminary signal is generated. In some embodiments, the method and apparatus may generate a third signal that causes the rotor again to rotate in the opposite direction. The third signal illustratively is generated after the second signal is generated.

In various embodiments, the method and apparatus cause the rotor to alternately rotate through the at rest position a predetermined number of times before beginning rotation in the given direction. In addition, the motor may be a wide variety of different types of motors, such as an AC motor or a DC motor. There are times when the method and apparatus may determine if the rotor can overcome startup inertia to rotate in the given direction. The rotor may begin rotating in the given direction if it is determined that the rotor can overcome startup inertia to rotate in the given direction.

In accordance with another aspect of the invention, an apparatus capable of starting an electric motor from an at rest position, where the motor has a rotor that rotates in a given direction during steady state operation, has a gyrator operatively coupled with the rotor, and rotation circuitry operatively coupled with the gyrator. The gyrator generates a preliminary signal that causes the rotor to rotate in an opposite direction to that of the given direction. The rotation circuitry begins rotation of the rotor in the given direction after the rotor rotates in the opposite direction.

In accordance with other aspects of the invention, an apparatus and method of starting an electric motor from an at rest position, where the motor has a rotor that rotates in a given direction during steady state operation, determines if the rotor can overcome startup inertia. A monitor or other similarly functioning apparatus may effectuate this function. If it is determined that the rotor cannot overcome startup inertia, then the method and apparatus cause the rotor to rotate in an opposite direction to that of the given direction. Next, the apparatus and method begin rotation in the given direction.

In some embodiments, the method and apparatus cause the rotor to rotate in the opposite direction to that of the given direction if it is determined that the rotor can overcome startup inertia. In addition, the method and apparatus may cause the rotor to alternately rotate in opposite directions a predetermined plural number of times before beginning rotation in the given direction.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing advantages of the invention will be appreciated more fully from the following further description thereof with reference to the accompanying drawings wherein.

DESCRIPTION OF ILLUSTRATIVE EMBODIMENTS

In illustrative embodiments, a motor gyrates its rotor before beginning its start-up process (from rest). Specifically, illustrative embodiments gyrate the rotor in opposing directions before beginning rotor rotation. Details of illustrative embodiments are discussed below.

Figure 1:
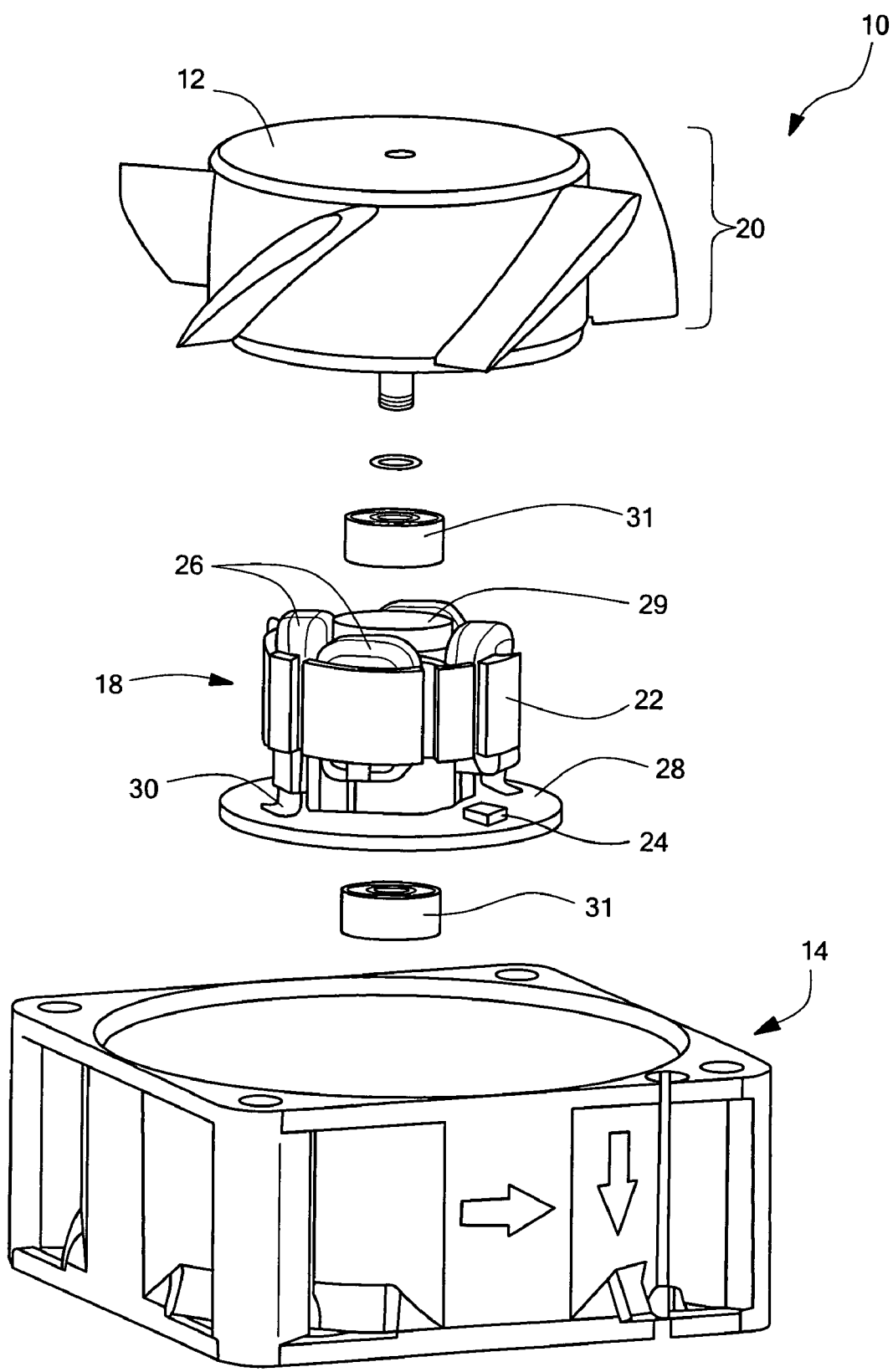
FIG. 1 schematically shows an exploded view of a motor that may be used in illustrative embodiments of the invention.

FIG. 1 schematically shows an exploded view of a four pole DC motor (referred to herein as "motor 10") that may execute the noted start-up process in accordance with illustrative embodiments of the invention. The motor 10 includes a propeller 12 and thus, is a part of a cooling fan. To that end, the motor 10 includes a housing 14 with venturi (not shown), a stator portion 18 secured to the housing 14, and a rotor 20, which includes the propeller 12.

It should be noted that although the motor 10 is implemented as a fan, illustrative embodiments apply to other applications that use motors. Accordingly, description of the motor 10 as a fan is by illustration only and not intended to limit various embodiments of the invention. In a similar manner, although the discussed motor 10 is a DC motor, principles of the invention apply to other types of motors, such as bidirectional AC and DC motors. Accordingly, discussion of a four pole, discussion of the DC motor 10 is illustrative and not intended to limit all embodiments of the invention. Moreover, although a propeller 12 is shown, embodiments of the invention apply to other elements that perform a similar air flow function. For example, an impeller may be used and thus, is considered equivalent to a propeller.

The stator portion 18 includes an insulated stator core 22, coils 26 wrapped about four poles formed by the stator core 22, and a circuit board 28 having electronics for controlling the energization of the coils 26. In illustrative embodiments, the stator core 22 is insulated by a molded insulation layer having an arbor 29 extending through a central tubular opening of the stator core 22. Bearings 31 are secured within the arbor 29 for receiving a rotor shaft. For additional details of the insulation layer, see U.S. patent application Ser. No. 10/078,648, now abandoned, the disclosure of which is incorporated herein, in its entirety, by reference.

The circuit board 28 may be a printed circuit board having electronics for producing a magnetic field (via the coils 26) based upon the rotational position of the rotor 20 (i.e., commutation). For example, for purposes of commutation, the circuit board 28 includes a magnetic sensor 30 (e.g., a Hall effect sensor), switching circuitry (not shown), and other related circuitry for controlling the flow of current to the coils 26. The printed circuit board 28 also has a microprocessor 24 programmed to control start-up processes and/or commutation. For additional details relating to some of the circuit elements that may be included on the circuit board 28, see, for example, applicant's earlier U.S. Pat. No. 4,494,028, the disclosure of which is incorporated herein, in its entirety, by reference. Operation of various aspects of the microprocessor 24 is discussed below with reference to FIG. 2.

In accordance with illustrative embodiments, as noted above, during start-up from rest, the electromagnet formed by the stator portion 18 causes the rotor 20 to move in a predetermined manner before executing standard start-up processes. In the context of the DC motor 10 shown in FIG. 1, the electromagnet produces a oscillating magnetic field before beginning commutation processes.

Figure 2:
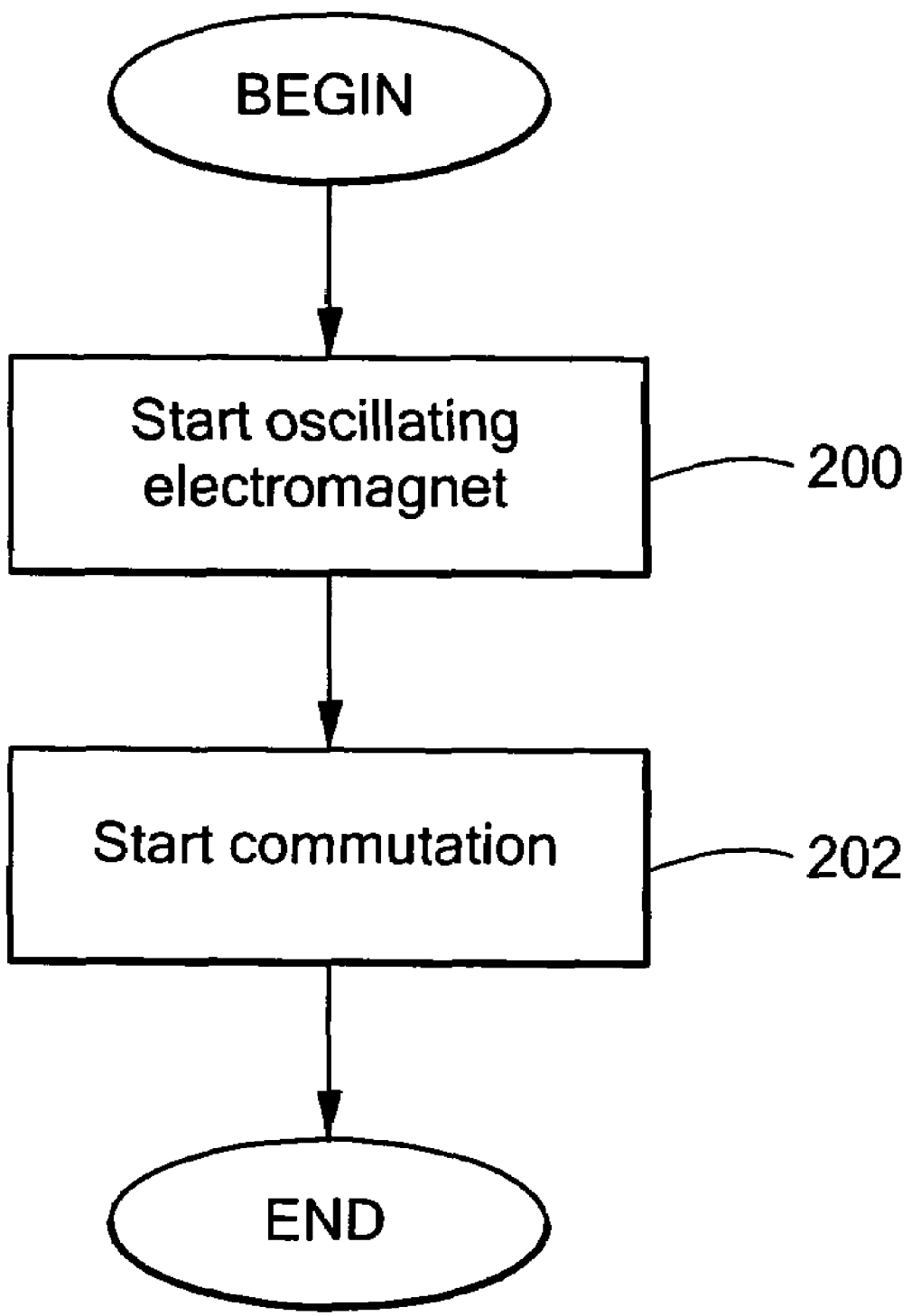
FIG. 2 shows a motor start-up process implemented in accordance with illustrative embodiments of the invention.

FIG. 2 shows a start-up process executed by the motor 10 shown in FIG. 1. The process begins at step 200, in which the rotor 20 gyrates a predetermined amount. In illustrative embodiments, the rotor 20 rotates (from rest) in a first direction (e.g., opposite to normal rotation, such as counterclockwise), then in the other direction (e.g., clockwise), and finally the first direction again. To that end, the microprocessor 24 is programmed effectively to act as a gyrator that causes the stator electromagnet to change the polarity of its magnetic field three times. For example, the poles may be energized as follows:

Cycle 1: north, south, north, south for about 100 milliseconds,
Cycle 2: south, north, south, north for approximately the next 100 milliseconds, and
Cycle 3: north, south, north, south for approximately the next 50 milliseconds.

To that end, the microprocessor 24 may generate one or more signals that cause this gyration. In illustrative embodiments, the signal(s) may cause a preliminary magnetic or electric signal that causes the rotor 20 to rotate at least in an opposite direction to that of the intended direction of rotation.

During testing, a four pole, DC electric motor 10 following the above noted sequence alternatively moved in different rotational directions (as noted above) until commutation began (i.e., until rotor 20 movement is both detected and controlled by signals received by the magnetic sensor 30). Accordingly, substantially immediately after the rotor 20 is gyrated, the process continues to step 202 by beginning normal commutation. During the noted test, after commutation began, the rotor 20 began rotating in the intended commutation direction.

The time selected to gyrate during each cycle above is selected to cause sufficient rotor movement. Factors to take into account that could affect rotor gyration include, among other things, anticipated drag from components (e.g., from the bearings 31), anticipated drag produced by lubricants (e.g., oil), anticipated operating temperature, and the rated start-up torque of the motor 10. Accordingly, the rotor 20 could rotate a small distance (e.g., 5 degrees) or a relatively large distance (e.g., 90 degrees or greater), depending upon the drag received by the rotor 20. If drag is low enough, the rotor 20 may move greater than 90 degrees. In some such cases, the rotor 20 may rotate in the same direction for the entire gyration sequence. It is not anticipated that such a result alone would prevent a successful motor start-up.

It should be noted that the cycles noted above are for exemplary purposes only and are not intended to limit all aspect of the invention. Accordingly, as few as one cycle or more than three cycles may be used. For example, the rotor 20 may rotate once from rest in a direction opposite that of normal rotation, and then begin normal commutation. Moreover, different cycle times may be selected.

Depending upon the amount of drag on the rotor 20, gyrating the rotor 20 before executing conventional start-up processes (e.g., the commutation sequence noted above for a DC motor) should enable the motor 10 to overcome inertial drag at start-up. Consequently, many types of lower torque motors still can successfully start when subjected to extreme environmental conditions.

To illustrate this point, consider the conventional four pole DC motor 10 as discussed above. As noted above, the electromagnet in the stator portion 18 and permanent magnet in the rotor 20 interact to rotate the rotor 20. This interaction effectively produces a rotational torque that causes the rotor 20 to rotate. The strength of this torque, however, varies as the rotor 20 rotates. The torque thus may be strongest at some points of the rotation and weakest at other points in the rotation. Moreover, the strength of the torque in the opposite direction essentially compliments that in the intended direction. For example, a rotor 20 at a high strength torque position in the intended direction is at a low strength torque position for rotation in the opposite direction. In a corresponding manner, a rotor 20 at a low strength torque position in the intended direction is at a high strength torque position for rotation in the opposite direction When at rest, the rotor 20 can be any arbitrary rotational position relative to stator portion 18. Specifically, such a position thus can be anywhere from one of the highest torque positions to one of the lowest torque positions. For example, the rotor 20 may gyrate by moving in the intended direction from a higher torque position to a lower torque position. When the electromagnet reverses its polarity, however, the rotor 20 is at a higher torque position for rotating in the opposite direction. Accordingly, the rotor 20 may rotate in the opposite direction to or past its original at rest position.

The electromagnet again may switch polarity once or twice, and then begin normal commutation.

There are many instances, however, in which the rotor 20 is at a relatively high torque position (for rotating in the intended direction) when at rest. In that case, the rotor 20 is at a relatively low torque position for rotating in the opposite direction. Drag on the rotor 20 therefore may be too strong for the rotor 20 to rotate in the opposite direction. In that case, various embodiments first may unsuccessfully attempt to rotate in the opposite direction, and then attempt to rotate in the intended direction. If unable to rotate in either direction, the motor 10 is expected to not operate (absent some external assist or a higher torque power). Accordingly, various embodiments can not cause all motors to rotate if the rotor drag is to high. In some embodiments, however, the microprocessor 24 can be programmed to cause a higher than normal torque to the rotor 20 in such instance in an attempt to enable rotation.

If the rotor 20 can rotate at least a small amount in the intended direction, however, then it may be able to rotate some corresponding amount in the opposite direction. In fact, due to its inertia, the rotor 20 may rotate a greater distance in the opposite direction than it rotated in the intended direction. Accordingly, when the electromagnet again switches for rotation in the intended direction, the rotor 20 may rotate even farther. After such gyrations, the motor 10 may begin its normal commutation processes. Alternatively, the motor 10 may continue to gyrate the rotor 20 one or more times to ensure proper commutation.

Even a small rotation in either direction from that rest position could enable the motor 10 to begin normal operation. In particular, such rotation may overcome whatever was causing the rotor 20 to not move. For example, condensation may freeze within the bearings of the motor 10. Movement in either direction therefore may break or weaken the frozen condensation, thus permitting more free movement in either direction. In fact, such movement may be a very small amount that does not fully permit the rotor 20 to move freely. The rotor 20 therefore should encounter less resistance when rotating in the other direction during the next cycle. While rotating during that next cycle, the inertia of the rotor 20 therefore should enable the rotor 20 to overcome the resistance beyond the at rest position—thus permitting the rotor 20 to rotate somewhat farther than its initial rotation. This cycle repeats, thus permitting the motor 10 to operate in a normal manner. Accordingly, the process essentially "clears a path" for rotor rotation.

In some embodiments, rather than gyrating a predetermined number of times, such as three times noted above, the microprocessor 24 causes the rotor 20 to rotate until it determines that the rotor is capable of rotating a predetermined angular distance. For example, the rotor 20 may gyrate until the it has the capability of rotating a full 360 degrees, or 180 degrees, or some other predetermined amount. The direction of rotation can be in either the intended direction or in the opposite direction. In a similar manner, the microprocessor 24 can act as a monitor to first determine if the rotor 20 can overcome startup inertia (e.g., by attempting to start commutating). If it cannot overcome startup inertia (i.e., startup torque is not enough to overcome at rest drag), then the rotor 20 may begin gyrating. If it can overcome startup inertia, however, then the rotor 20 may simply begin normal commutation. In the latter case, no gyration is necessary.

Other embodiments may gyrate based upon some other parameter, such as for a predetermined time. As yet another example, the rotor 20 may alternately rotate through the at rest position a predetermined number of times before beginning rotation in the given direction. Accordingly, various embodiments are not limited to the means used to determine the number of gyrations.

As noted above, illustrative embodiments apply to a wide variety of motor types, including one and two directional AC and DC motors. When considered for use with a two-directional motor, startup gyration in a direction that is opposite to that of the steady state direction (during a given use) should be considered to be gyration in the direction opposite to that of steady state operation.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods (e.g., the flow chart described above and executed by the noted microprocessor 24) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of starting an electric motor from an at rest position, the motor having a rotor that rotates in a given direction during steady state operation, the method comprising:

generating a preliminary signal that causes the rotor to rotate in an opposite direction to that of the given direction; and beginning rotation of the rotor in the given direction after the rotor rotates in the opposite direction.

2. The method as defined by claim 1 wherein the preliminary signal comprises a magnetic field.

3. The method as defined by claim 1 wherein the preliminary signal comprises an electrical signal.

4. The method as defined by claim 1 further comprising:
generating a second signal that causes the rotor to rotate in the given direction, the second signal being generated after the preliminary signal is generated.

5. The method as defined by claim 4 further comprising:
generating a third signal that causes the rotor again to rotate in the opposite direction, the third signal being generated after the second signal is generated.

6. The method as defined by claim 1 further comprising causing the rotor to alternately rotate through the at rest position a predetermined number of times before beginning rotation in the given direction.

7. The method as defined by claim 1 wherein the motor is a one directional motor.

8. The method as defined by claim 1 further comprising determining if the rotor can overcome startup inertia to rotate in the given direction, beginning rotation of the rotor in the given direction if it is determined that the rotor can overcome startup inertia to rotate in the given direction.

9. An apparatus for starting an electric motor from an at rest position, the motor having a rotor that rotates in a given direction during steady state operation, the apparatus comprising:
a gyrator operatively coupled with the rotor, the gyrator generating a preliminary signal that causes the rotor to rotate in an opposite direction to that of the given direction; and
rotation circuitry operatively coupled with the gyrator, the rotation circuitry beginning rotation of the rotor in the given direction after the rotor rotates in the opposite direction.

10. The apparatus as defined by claim 9 wherein the preliminary signal comprises a magnetic field.

11. The apparatus as defined by claim 9 wherein the preliminary signal comprises an electrical signal.

12. The apparatus as defined by claim 9 wherein the gyrator generates a second signal that causes the rotor to rotate in the given direction, the second signal being generated after the preliminary signal is generated.

13. The apparatus as defined by claim 12 wherein the gyrator generates a third signal that causes the rotor again to rotate in the opposite direction, the third signal being generated after the second signal is generated.

14. The apparatus as defined by claim 9 wherein the gyrator causes the rotor to alternately rotate through the at rest position a predetermined number of times before beginning rotation in the given direction.

15. The apparatus as defined by claim 9 further comprising a monitor operatively coupled with the rotor, the monitor determining if the rotor can overcome startup inertia to rotate in the given direction, the rotation circuitry beginning rotation of the rotor in the given direction if it is determined that the rotor can overcome startup inertia to rotate in the given direction.

16. A method of starting an electric motor from an at rest position, the motor having a rotor that rotates in a given direction during steady state operation, the apparatus comprising:

determining if the rotor can overcome startup inertia;
if it is determined that the rotor cannot overcome startup inertia, then causing the rotor to rotate in an opposite direction to that of the given direction; and
beginning rotation in the given direction.

17. The method as defined by claim 16 further comprising not causing the rotor to rotate in the opposite direction to that of the given direction if it is determined that the rotor can overcome startup inertia.

18. The method as defined by claim 16 wherein the motor is one of an AC or a DC motor.

19. The method as defined by claim 16 further comprising causing the rotor to alternately rotate in opposite directions a predetermined plural number of times before beginning rotation in the given direction.

20. An apparatus for starting an electric motor from an at rest position, the motor having a rotor that rotates in a given direction during steady state operation, the apparatus comprising:
a monitor operatively coupled with the rotor, the monitor determining if the rotor can overcome startup inertia;
a gyration module operatively coupled with the monitor, the gyration module causing the rotor to rotate in an opposite direction to that of the given direction if it is determined that the rotor cannot overcome startup inertia; and
rotation circuitry for beginning rotation in the given direction.

21. The apparatus as defined by claim 20 wherein the gyration module does not cause the rotor to rotate in the opposite direction to that of the given direction if it is determined that the rotor can overcome startup inertia.

22. The apparatus as defined by claim 20 wherein the motor is a one directional motor.

23. The method as defined by claim 20 wherein the gyration module causes the rotor to alternately rotate in opposite directions a predetermined number of times before beginning rotation in the given direction.

24. A computer program product for use on a computer system for starting an electric motor from an at rest position, the motor having a rotor that rotates in a given direction during steady state operation, the computer program product comprising a computer usable medium having computer readable program code thereon, the computer readable program code comprising:
program code for determining if the rotor can overcome startup inertia;
program code for causing the rotor to rotate in an opposite direction to that of the given direction if it is determined that the rotor cannot overcome startup inertia; and
program code for beginning rotation in the given direction.

25. The computer program product as defined by claim 24 further comprising program code for not causing the rotor to rotate in the opposite direction to that of the given direction if it is determined that the rotor can overcome startup inertia.

26. The computer program product as defined by claim 24 further comprising program code for causing the rotor to alternately rotate in opposite directions a predetermined number of times before beginning rotation in the given direction.

* * * * *